US010606608B2

(12) United States Patent
Roh et al.

(10) Patent No.: US 10,606,608 B2
(45) Date of Patent: Mar. 31, 2020

(54) METHOD OF PROVIDING REMOTE DESKTOP SERVICE AND METHOD OF OPERATING REMOTE DESKTOP

(71) Applicant: NHN Entertainment Corporation, Seongnam-si (KR)

(72) Inventors: Byungseok Roh, Seongnam-si (KR); Jae-Wan Jang, Seongnam-si (KR); Cheol Hyeon Jo, Seongnam-si (KR)

(73) Assignee: NHN Entertainment Corporation, Seongnam-si (KR)

( * ) Notice: Subject to any disclaimer, the term of this patent is extended or adjusted under 35 U.S.C. 154(b) by 143 days.

(21) Appl. No.: 15/985,143

(22) Filed: May 21, 2018

(65) Prior Publication Data
US 2018/0336039 A1 Nov. 22, 2018

(30) Foreign Application Priority Data

May 22, 2017 (KR) .................. 10-2017-0063038

(51) Int. Cl.
| | | |
|---|---|---|
| G06F 9/00 | (2006.01) |
| G06F 15/177 | (2006.01) |
| G06F 9/4401 | (2018.01) |
| H04L 29/06 | (2006.01) |
| G06F 9/451 | (2018.01) |

(52) U.S. Cl.
CPC ............ *G06F 9/441* (2013.01); *G06F 9/4416* (2013.01); *G06F 9/4418* (2013.01); *G06F 9/452* (2018.02); *H04L 67/42* (2013.01)

(58) Field of Classification Search
None
See application file for complete search history.

(56) References Cited

U.S. PATENT DOCUMENTS

| 5,306,102 A | 4/1994 | Ota |
| 10,089,133 B2 | 10/2018 | Oh et al. |
| 2006/0155837 A1 | 7/2006 | Kobayashi et al. |

FOREIGN PATENT DOCUMENTS

| JP | H05-177885 | 7/1993 |
| JP | 2006-195703 | 7/2006 |
| JP | 2007-233815 | 9/2007 |
| JP | 2014-200044 | 10/2014 |
| KR | 10-2010-0060505 | 6/2010 |
| KR | 10-2012-0046807 | 5/2012 |
| KR | 10-2017-0000567 | 1/2017 |

*Primary Examiner* — Nitin C Patel
(74) *Attorney, Agent, or Firm* — H. C. Park & Associates, PLC

(57) ABSTRACT

A method of providing a service of a remote desktop by a main server to a client includes: commanding, before receiving a service request for the remote desktop from the client, the remote desktop to power on; determining, in response to receiving the service request from the client, an operating system corresponding to the client based on the received service request; and supporting booting of the determined operating system of the remote desktop by communicating with the remote desktop.

10 Claims, 7 Drawing Sheets

METHOD OF PROVIDING REMOTE DESKTOP SERVICE AND METHOD OF OPERATING REMOTE DESKTOP

CROSS-REFERENCE TO RELATED APPLICATION

This application claims priority from and the benefit of Korean Patent Application No. 10-2017-0063038, filed on May 22, 2017, which is hereby incorporated by reference for all purposes as if fully set forth herein.

BACKGROUND

Field

Exemplary embodiments of the invention relate generally to a network system including a remote desktop, and more particularly, to a method of providing and managing a remote desktop service and a method of operating a remote desktop.

Discussion of the Background

Due to the high performance and multi-functionality of desktops, desktops are being used over wide ranges such as homes, schools and companies. Such desktops are difficult to carry around because they have restricted portability unlike portable laptops, etc. Also, for example, in the case of using personal desktops in companies at work, it is difficult to integrally mange the data or to improve the security of the data, as a whole.

To solve these problems, a remote desktop service has been proposed, which provides remotely controllable desktops and allows users to access and use the desktops through a network. In this case, remote booting of the desktops connected to the network is required.

The above information disclosed in this Background section is only for understanding of the background of the inventive concepts, and, therefore, it may contain information that does not constitute prior art.

SUMMARY

Methods according to exemplary embodiments of the invention may provide a method of operating and providing a remote desktop to a client having decreased delay after receiving a service request from the client.

According to one or more embodiments of the invention, a method of providing a service of a remote desktop by a main server to a client includes: commanding, before receiving a service request for the remote desktop from the client, the remote desktop to power on; determining, in response to receiving the service request from the client, an operating system corresponding to the client based on the received service request; and supporting booting of the determined operating system of the remote desktop by communicating with the remote desktop.

The method of providing the service of the remote desktop may further include supporting booting of a pre-boot execution environment (PXE) of the remote desktop by communicating with the remote desktop, before receiving the service request from the client, wherein the remote desktop may be configured to operate in a standby mode after completing the booting of the PXE.

The method providing the service of the remote desktop may further include commanding release of the standby mode in response to receiving the service request, wherein the supporting of the booting of the determined operating system may be performed after the step of commanding of the release of the standby mode.

The supporting of the booting of the PXE may include: transmitting booting information for the remote desktop to load a boot file of the PCE, to the remote desktop, in response to a request from the remote desktop.

The supporting of the booting of the determined operating system may include: transmitting booting information for the remote desktop to the remote desktop in response to receiving a request from the remote desktop, wherein the booting information may include a boot file of the determined operating system.

According to one or more exemplary embodiments of the invention, a method of operating a remote desktop connected with a main server through a network, includes: receiving a power-on command from the main server; performing a power-on self-test in response to the power-on command; operating in a standby mode after completing the power-on self-test; releasing the standby mode in response to receiving a release command from the main server; and performing booting of an operating system corresponding to a client, by communicating with the main server, after the release of the standby mode.

The method of operating the remote desktop may further include: performing booting of a pre-boot execution environment (PXE), by communicating with the main server, after performing the power-on self-test, wherein the operating in the standby mode may be performed after completing the performing booting of the PXE.

The method of operating the remote desktop, wherein the performing of the booting of the PXE may include: loading a boot file of the PXE by receiving booting information from the main server, and wherein the booting of the PXE may be performed based on the loaded boot file.

The method of operating the remote desktop, wherein the performing of the booting of the operating system may include: loading a boot file of the operating system by receiving booting information from the main server, and wherein the booting of the operating system may be performed based on the loaded boot file.

The method of operating the remote desktop, may further include: providing a remote desktop service by communicating with the client through the network after completing the booting of the operating system.

According to yet another exemplary embodiment of the invention, a method of providing a remote desktop service with remote desktops to clients through a network, including: adjusting a number of the remote desktops having a standby mode, based on a predetermined policy, the adjusting may include: commanding at least one remote desktop among remote desktops to power on, before receiving a service request for the remote desktop service from the clients; and supporting booting of a pre-boot execution environment (PXE) of the at least one remote desktop; and operating the at least one remote desktop in the standby mode.

The method of providing the remote desktop service may further include: monitoring a number of clients using the remote desktop service, wherein the adjusting the number of the remote desktops having a standby mode may include: adjusting the number of remote desktops having the standby mode, depending on the result of the monitoring of the number of clients using the remote desktop service.

The method of providing the remote desktop service may further include: commanding one remote desktop of the at least one remote desktop in standby mode to release the standby mode in response to receiving a service request for the remote desktop service from any one of the clients.

The method of providing the remote desktop service may further include: supporting booting of an operating system in response to the service request received from the any one of the clients, by communicating with the one remote desktop which has released the standby mode.

Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. To this end, the term "connected" may refer to physical, electrical, and/or fluid connection, with or without intervening elements. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 1:
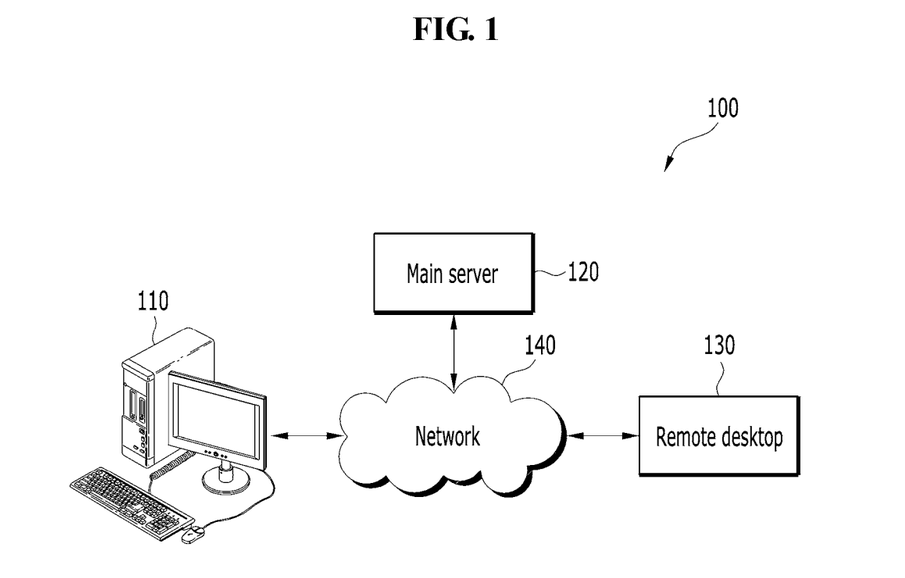
FIG. 1 is a diagram illustrating an example of a network system including a remote desktop.

FIG. 1 is a diagram illustrating an example of a network system 100 including a remote desktop 130.

Referring to FIG. 1, the network system 100 includes a client 110, a main server 120, the remote desktop 130 and a network 140.

The client 110 communicates with the main server 120 and the remote desktop 130 through the network 140. The client 110 may request the use of the remote desktop 130 to the main server 120, and may use a remote desktop service by communicating with the remote desktop 130 when the service request is approved by the main server 120.

The client 110 may include a device or the like capable of transmitting and receiving information under a wired and/or wireless environment, such as a computer, a ultra mobile PC (UMPC), a workstation, a net-book, a personal digital assistant (PDA), a portable computer, a web tablet, a wireless phone, a mobile phone, a smart phone, an e-book, a portable multimedia player (PMP), and a portable game machine.

The main server 120 is connected to the client 110 and the remote desktop 130 through the network 140. The main server 120 is configured to manage a remote desktop service. The main server 120 commands the remote desktop 130 to power on and supports the remote desktop 130 to perform pre-boot execution environment (PXE) booting and operating system (OS) booting, thereby allowing the client 110 to use the remote desktop 130.

The remote desktop 130 is connected to the client 110 and the main server 120 through the network 140. The remote desktop 130 may perform a power-on self-test when the main server 120 transmits a power-on command. The power-on self-test means an operation of inspecting an entire system at a time power is applied. For example, for a predetermined period of time from when power starts to be applied to the remote desktop 130, the remote desktop 130 may diagnose whether internal hardware components operate normally, through the power-on self-test.

After completing the power-on self-test, the remote desktop 130 may perform the PXE booting by communicating with the main server 120. The remote desktop 130 may receive a PXE boot file from the main server 120, and may load the received PXE boot file.

After performing the PXE booting, the remote desktop 130 may perform the OS booting by communicating with the main server 120. The remote desktop 130 may receive an OS boot file from the main server 120, and may load the received OS boot file.

After the OS booting is completed, the remote desktop 130 may provide a remote desktop service to the client 110 by communicating with the client 110.

As an exemplary embodiment, the main server 120 and the remote desktop 130 provide an hosted desktop infrastructure (HDI)-based Desktop as a Service (DaaS).

Figure 2:
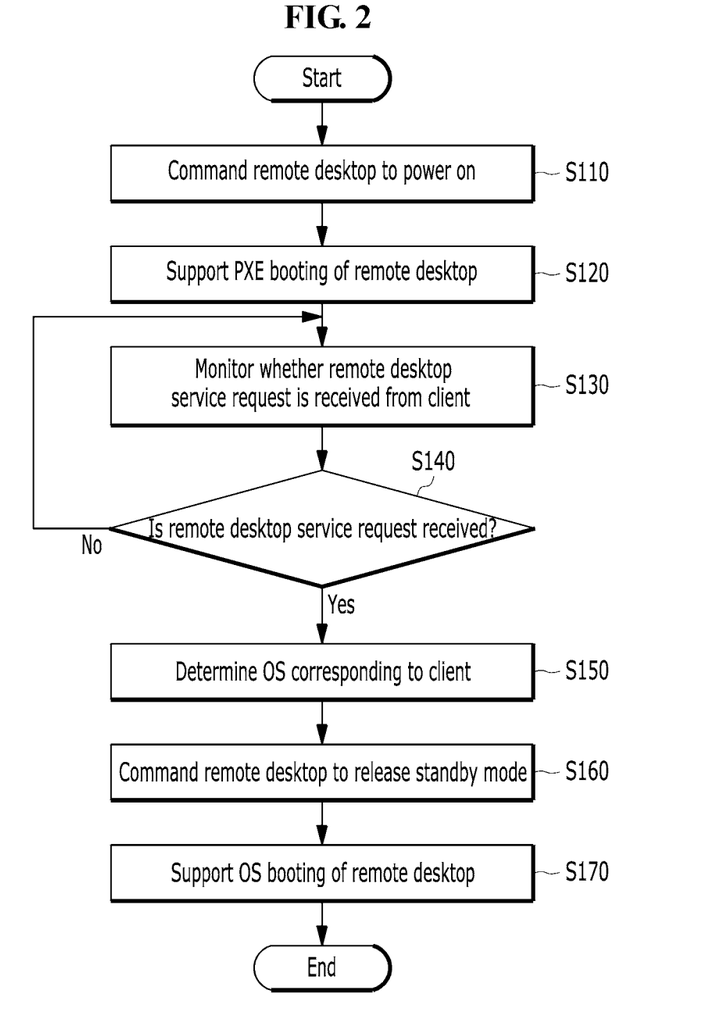
FIG. 2 is an example of a flow chart explaining a method of operating a main server according to exemplary embodiments.

FIG. 2 is an example of a flow chart explaining a method of operating the main server 120 according to exemplary embodiments.

Referring to FIGS. 1 and 2, at step S110, the main server 120 commands the remote desktop 130 to power on. According to the exemplary embodiment of the present disclosure, the main server 120 transmits a power-on command before a service request for the remote desktop 130 is received from the client 110.

At step S120, the main server 120 supports the PXE booting of the remote desktop 130 by communicating with the remote desktop 130. As an exemplary embodiment, the main server 120 may provide the PXE boot file to the remote desktop 130. According to the exemplary embodiment of the present disclosure, the step S120 may also be performed before the service request for the remote desktop 130 is received from the client 110.

Then, after completing the PXE booting, the remote desktop 130 may operate in a standby mode. Accordingly, the remote desktop 130 may stand by under an environment (that is, PXE) capable of performing the OS booting until a next command is received.

At step S130, the main server 120 monitors whether a service request for the remote desktop 130 is received from the client 110. At step S140, the main server 120 performs step S150 in response to determining that a service request for the remote desktop 130 is received from the client 110. The main server 120 may repeat the step S130 until a service request for the remote desktop 130 is received from the client 110.

At the step S150, when a service request for the remote desktop 130 is received from the client 110, the main server 120 determines an OS corresponding to the client 110. For example, the main server 120 may determine an OS depending on the client 110 which transmits the service request. However, the exemplary embodiments of the present disclosure is not limited thereto, and an OS corresponding to the client 110 may be determined according to various policies.

At step S160, the main server 120 commands the remote desktop 130 to release the standby mode. According to exemplary embodiments, the sequence of the step S150 and the step S160 may be changed.

At step S170, the main server 120 supports the booting of the OS determined at the step S150, by communicating with the remote desktop 130. As an exemplary embodiment, the main server 120 may transmit the OS boot file to the remote desktop 130.

Figure 3:
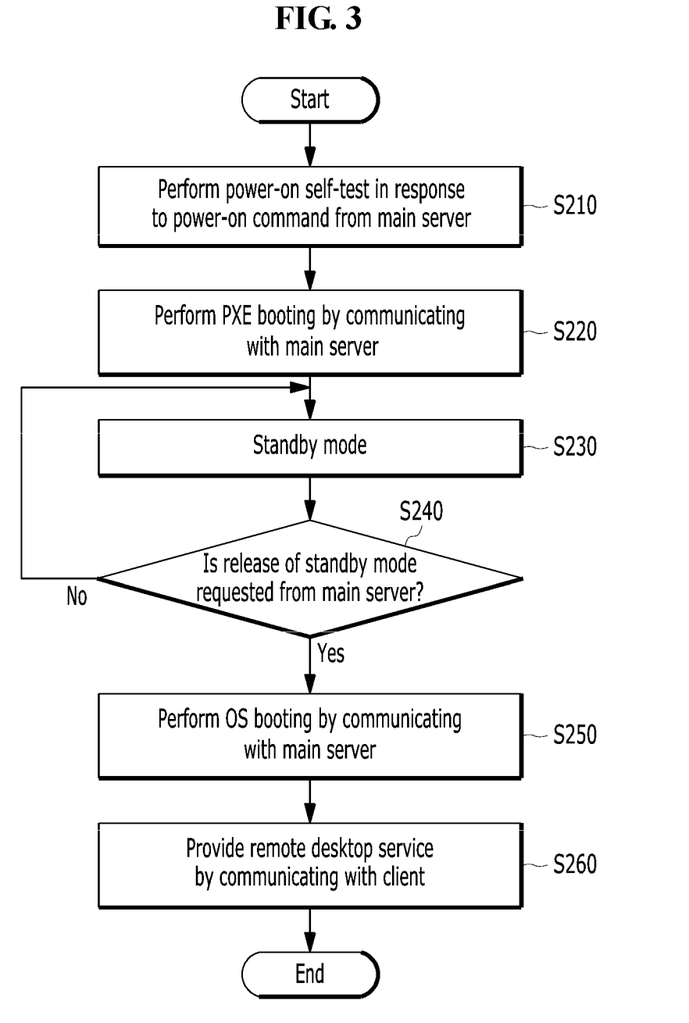
FIG. 3 is an example of a flow chart explaining a method of operating a remote desktop according to exemplary embodiments.

FIG. 3 is an example of a flow chart explaining a method of operating the remote desktop 130 according to exemplary embodiments.

Referring to FIGS. 1 and 3, at step S210, the remote desktop 130 performs the power-on self-test in response to the power-on command from the main server 120. The remote desktop 130 diagnoses whether internal hardware components operate normally, through the power-on self-test. As an exemplary embodiment, the remote desktop 130 may load a basic input output system (BIOS) stored in the remote desktop 130, and may perform the power-on self-test according to the loaded BIOS.

At step S220, the remote desktop 130 performs the PXE booting by communicating with the main server 120. As an exemplary embodiment, the remote desktop 130 may transmit a request of the PXE boot file to the main server 120 after performing the power-on self-test, and the main server 120 may provide the corresponding PXE boot file to the remote desktop 130 in response to the request. The remote desktop 130 may perform the PXE booting according to the received PXE boot file.

At step S230, the remote desktop 130 operates in the standby mode. The remote desktop 130 may keep the standby mode under an environment (that is, PXE) capable of performing the OS booting.

At step S240, the remote desktop 130 determines whether the release of the standby mode is requested from the main server 120. In response to determining that the release of the standby mode is requested from the main server 120, step S250 is performed. In response to determining that the release of the standby mode is not requested from the main server 120, the remote desktop 130 continuously operates in the standby mode.

At the step S250, the remote desktop 130 performs the OS booting by communicating with the main server 120. The remote desktop 130 may transmit a request of the OS boot file to the main server 120, and the main server 120 may provide the OS boot file to the remote desktop 130 in response to the request. The remote desktop 130 may perform the OS booting according to the OS boot file provided from the main server 120.

At step S260, while being controlled under the booted OS, the remote desktop 130 provides a remote desktop service by communicating with the client 110.

According to the exemplary embodiment of the present disclosure, a remote desktop service may be provided within a short period of time after the use of the remote desktop 130 is requested from the client 110. This may be described in detail as follows. According to a comparative example, a power-on self-test may be performed by starting to apply power to the remote desktop 130, PXE booting may be performed after the service request of the remote desktop 130 is received from the client 110, and then OS booting may be performed. According to the exemplary embodiment of the present disclosure, the main server 120 may command the remote desktop 130 to perform the power-on self-test and the PXE booting before the service request of the remote desktop 130 is received from the client 110, thereby allowing the remote desktop 130 to have an environment (that is, PXE) capable of performing the OS booting. The main server 120 may command the remote desktop 130 to perform the OS booting after the service request of the remote desktop 130 is received from the client 110. Because the power-on self-test and the PXE booting are performed before the service request of the remote desktop 130 is received, and therefore, compared to the comparative example, the remote desktop 130 may complete the OS booting within a shorter period of time from a time when the service request for the remote desktop 130 is generated. Consequently, according to the exemplary embodiments of the present disclosure, a remote desktop service may be provided within a relatively shorter or decreased period of time or delay after receiving the service request of the remote desktop 130 from the client 110.

Figure 4:
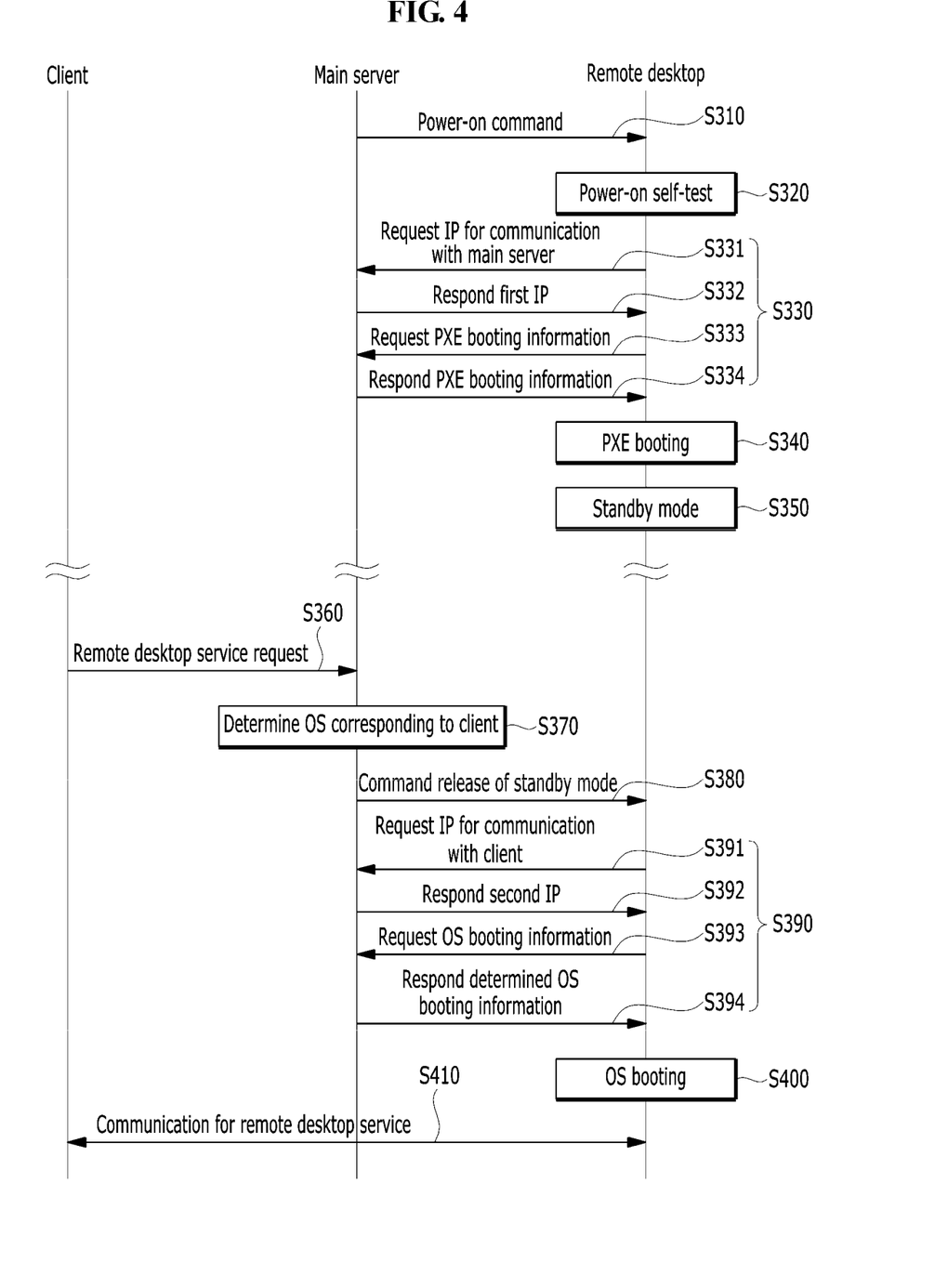
FIG. 4 is an example of a flow chart explaining the operations of a client, a main server and a remote desktop according to exemplary embodiments.

FIG. 4 is an example of a flow chart explaining the operations of the client 110, the main server 120 and the remote desktop 130 according to exemplary embodiments.

Referring to FIGS. 1 and 4, at step S310, the main server 120 transmits the power-on command to the remote desktop 130 before the client 110 generates a service request for the remote desktop 130 (refer to step S360).

At step S320, the remote desktop 130 starts to power on, and performs the power-on self-test.

At step S330, the main server 120 supports the PXE booting by communicating with the remote desktop 130. As an exemplary embodiment, the step S330 may include steps S331, S332, S333, and S334. At the step S331, after completing the power-on self-test, the remote desktop 130 may request an Internet Protocol (IP) address of the remote desktop 130 for establishing the communication between the main server 120 and the remote desktop 130. At the step S332, the main server 120 may provide a first IP address to the remote desktop 130. For example, the step S331 and the step S332 may be performed through the DHCP (dynamic host configuration protocol). Accordingly, the remote desktop 130 may communicate with the main server 120 by using the first IP address. At the step S333, the remote desktop 130 may request PXE booting information for loading the PXE boot file, to the main server 120. At the step S334, the main server 120 may provide the corresponding PXE booting information to the remote desktop 130. As an exemplary embodiment, the PXE booting information may include information indicating a path for accessing the PXE boot file. Such a path may indicate the main server 120 or may indicate another server which is connected to the network 140. As an exemplary embodiment, the PXE booting information may include the PXE boot file. For example, the step S333 and the step S334 may be performed through the trivial file transfer protocol (TFTP).

At step S340, the remote desktop 130 performs the PXE booting by loading the PXE boot file. For example, the remote desktop 130 may load the PXE boot file in an internal system memory, and may process the loaded PXE boot file.

At step S350, the remote desktop 130 operates in the standby mode after completing the PXE booting. The remote desktop 130 may keep the standby mode until a release command of the standby mode is received from the main server 120.

At step S360, the client 110 transmits a service request for the remote desktop 130, to the main server 120.

At step S370, the main server 120 may determine an OS corresponding to the client 110, in response to the service request for the remote desktop 130. For example, an OS may be determined depending on which client 110 has transmitted the service request. However, the exemplary embodiments of the present disclosure is not limited thereto, and an OS corresponding to the client 110 may be determined according to various policies.

At step S380, the main server 120 commands the remote desktop 130 to release the standby mode.

At step S390, the main server 120 supports the OS booting of the remote desktop 130 by communicating with the remote desktop 130. As an exemplary embodiment, the step S390 may include step S391, S392, S393, and S394. At the step S391, the remote desktop 130 may request the IP address of the remote desktop 130 for establishing the communication between the remote desktop 130 and the client 110, in response to the release command of the standby mode. At the step S392, the main server 120 may provide a second IP address to the remote desktop 130. For example, the step S391 and the step S392 may be performed through the DHCP. Accordingly, the remote desktop 130 may communicate with the client 110 by using the second IP address. At the step S393, the remote desktop 130 may request the OS booting information for loading the OS boot file, to the main server 120. At the step S394, the main server 120 may provide the booting information of the OS determined at the step, to the remote desktop 130. As an exemplary embodiment, the OS booting information may include information indicating a path for access to the OS boot file. Such a path may indicate the main server 120 or may indicate another server which is connected to the network 140. As an exemplary embodiment, the OS booting information may include the OS boot file. For example, the step S393 and the step S394 may be performed through the TFTP or the Internet Small Computer System Interface (iSCSI).

At step S400, the remote desktop 130 performs the OS booting by loading the OS boot file. For example, the remote desktop 130 may load the OS boot file in an internal system memory, and may process the loaded OS boot file.

At step S410, after the OS booting is completed, the remote desktop 130 may provide a remote desktop service by communicating with the client 110.

According to the exemplary embodiment of the present disclosure, the main server 120 causes the remote desktop 130 to have an environment capable of performing the OS booting, before the use of the remote desktop 130 is requested from the client 110. Consequently, a remote desktop service may be provided within a relatively short period of time after the use of the remote desktop 130 is requested from the client 110.

Figure 5:
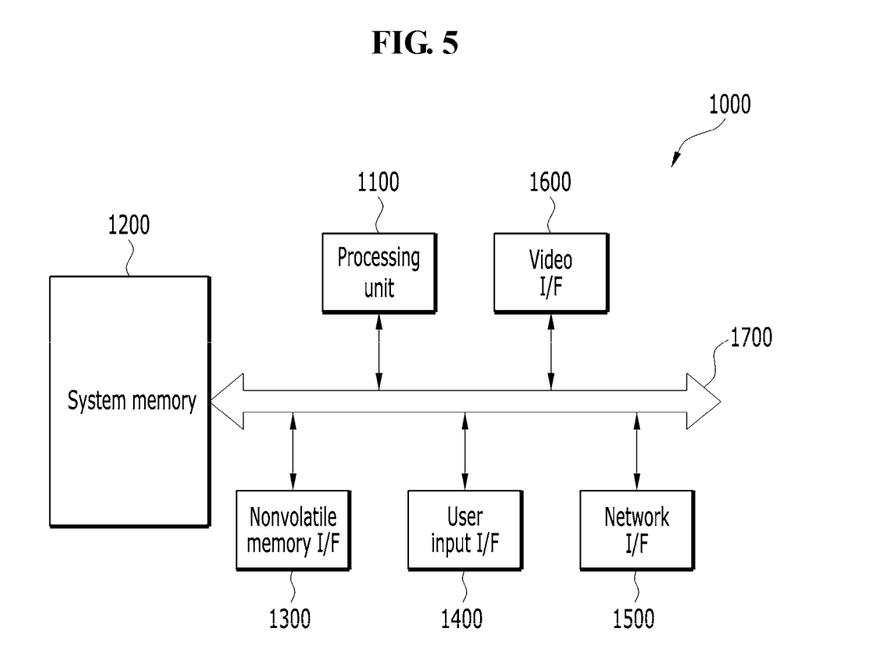
FIG. 5 is a block diagram illustrating an example of a computing device which may be any one of a client, a main server, and a remote desktop.

FIG. 5 is a block diagram illustrating an example of a computing device 1000 which may be any one of the client 110, the main server 120, and the remote desktop 130.

Referring to FIG. 5, the computing device 1000 may include at least one processor or processing unit 1100, a system memory 1200, a nonvolatile memory interface 1300, a user input interface 1400, a network interface 1500 and a video interface 1600.

The processing unit 1100 is connected to the system memory 1200, the nonvolatile memory interface 1300, the user input interface 1400, the network interface 1500 and the video interface 1600 through a system bus 1700. The processing unit 1100 controls the general operations of the computing device 1000. The system memory 1200 may include a storage medium of a volatile or nonvolatile memory type. The system memory 1200 may include a read-only memory (ROM) and a random access memory (RAM). For example, the ROM may store a BIOS. For example, the RAM may store data which is directly accessible by the processing unit 1100 or is currently being processed by the processing unit 1100. For example, the system memory 1200 may store at least a part of a PXE boot file, at least a part of an OS boot file and other application programs. However, the exemplary embodiments of the present disclosure is not limited thereto.

As an exemplary embodiment, in the case where the computing device 1000 is the main server 120 of FIG. 1, the processing unit 1100 may load files or program codes including instructions for performing the steps described above with reference to FIG. 2, in the system memory 1200, and may process the loaded files or program codes. As an exemplary embodiment, in the case where the computing device 1000 is the remote desktop 130 of FIG. 1, the processing unit 1100 may load files or program codes including instructions for performing the steps described above with reference to FIG. 3, in the system memory 1200, and may process the loaded files or program codes.

The computing device 1000 may include a nonvolatile storage medium. For example, the computing device 1000 may include a nonvolatile storage medium such as a hard disk drive, an solid state drive (SSD), a magnetic disk drive, an optical disk drive, a flash memory, a phase-change RAM (PRAM), an magnetic RAM (MRAM), an resistive RAM (RRAM) and an ferroelectric RAM (FRAM). These nonvolatile storage mediums are connected to the system bus 1700 through the nonvolatile memory interface 1300.

The user input interface 1400 connects input devices capable of sensing a command or information by a user's manipulation, such as a touch pad, a key pad, a mouse, a finger scan sensor, a dome switch and a jog wheel, to the system bus 1700.

The network interface 1500 connects a network card which is configured to provide a connection with another computing device through a network (refer to the reference numeral 140 of FIG. 1), to the system bus 1700.

The video interface 1600 interfaces and connects a display device which is configured to display information processed in the computing device 1000 according to the control of the processing unit 1100 or a graphic processing unit to the system bus 1700.

Figure 6:
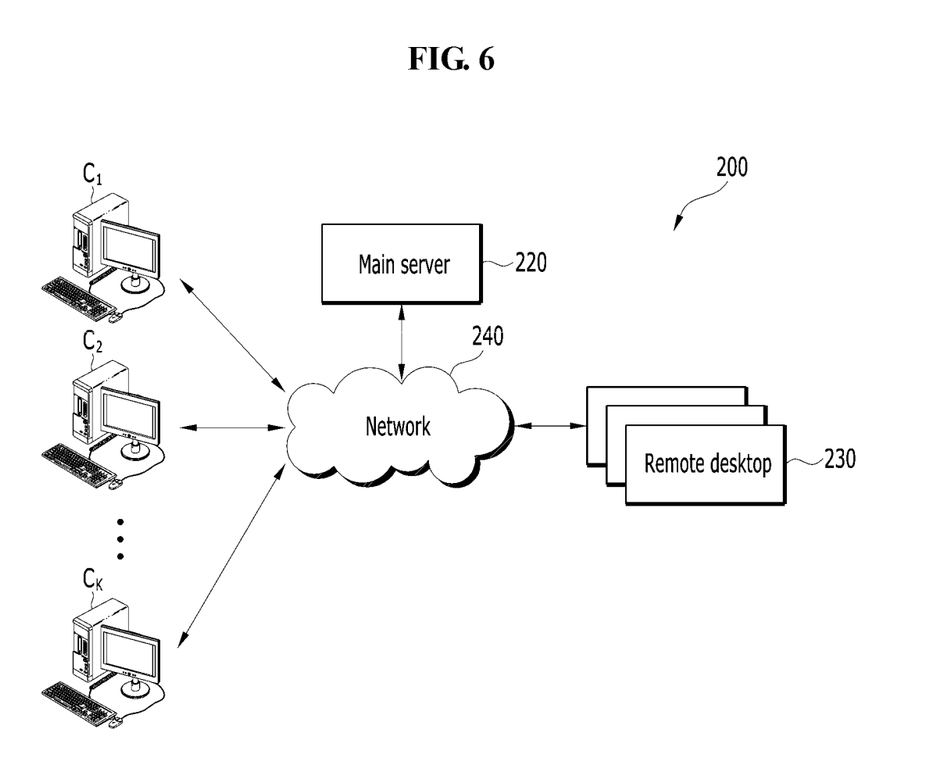
FIG. 6 is a diagram illustrating an example of a network system including a plurality of remote desktops.

FIG. 6 is a diagram illustrating an example of a network system 200 including a plurality of remote desktops 230.

Referring to FIG. 6, the network system 200 includes first to $k^{th}$ clients $C_1$ to $C_K$, a main server 220, the plurality of remote desktops 230, and a network 240 (where k is a real number).

Each of the first to $k^{th}$ clients $C_1$ to $C_K$ may communicate with the main server 220 and the plurality of remote desktops 230 through the network 240. Each of the first to $k^{th}$ clients $C_1$ to $C_K$ may be provided with a remote desktop service by using any one of the plurality of remote desktops 230. The main server 220 is configured to manage a remote desktop service using the plurality of remote desktops 230. Hereinbelow, duplicate descriptions will be omitted.

Figure 7:
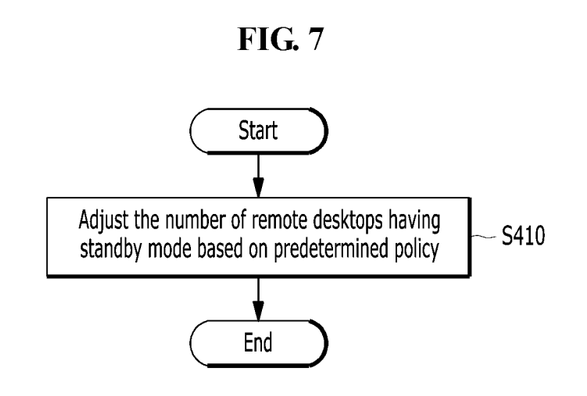
FIG. 7 is an example of a flow chart explaining a method of operating the main server of FIG. 6 according to exemplary embodiments.

FIG. 7 is an example of a flow chart explaining a method of operating the main server 220 of FIG. 6 according to exemplary embodiment.

Referring to FIGS. 6 and 7, at step S410, the main server 220 adjusts the number of remote desktops having a standby mode among the plurality of remote desktops 230, based on a predetermined policy. The main server 220 may select at least one remote desktop among the plurality of remote desktops 230, may command the selected remote desktops to power on (see the step S110 of FIG. 2) before the receiving service request of a remote desktop service from the clients $C_1$ to $C_K$, and may support the PXE booting of each of the selected remote desktops (see the step S120 of FIG. 2).

As an exemplary embodiment, the main server 220 may monitor the number of clients which are being provided with the remote desktop service by using remote desktops among the plurality of remote desktops 230, and may adjust the number of remote desktops having the standby mode among the plurality of remote desktops 230 depending on the result of the monitoring result. For example, as the number of the clients which are being provided with a remote the remote desktop service increases, the main server 220 may increase the number of remote desktops having the standby mode among the plurality of remote desktops 230.

As an exemplary embodiment, the main server 220 may adjust the number of remote desktops having the standby mode such that the number of remote desktops having the standby mode among the plurality of remote desktops 230 falls within a predetermined range.

According to the exemplary embodiment of the present disclosure, the main server 220 may adjust the number of remote desktops having the standby mode among the plurality of remote desktops 230, based on the predetermined policy. Accordingly, at least a part of the plurality of remote desktops 230 may have a power-off state. Therefore, while the OS booting of a corresponding remote desktop may be completed within a relatively shorter or decreased period of time or delay time after receiving a service request of a remote desktop service from a client, the power consumed by the plurality of remote desktops 230 may be reduced.

Some of the advantages that may be achieved by exemplary embodiments of the invention and exemplary methods of the invention may provide a client with a remote desktop service within a relatively shorter or decreased period of time or delay in response to receiving the service request of a remote desktop from the client.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of providing a service of a remote desktop by a main server to a client, the method comprising:
   commanding, before receiving a service request for the remote desktop from the client, the remote desktop to power on;
   determining, in response to receiving the service request from the client, an operating system corresponding to the client based on the received service request;
   supporting booting of a pre-boot execution environment (PXE) of the remote desktop by communicating with the remote desktop, before receiving the service request from the client;
   operating the remote desktop in a standby mode after completing the booting of the PXE; and
   commanding release of the standby mode in response to receiving the service request,
   supporting booting of the determined operating system of the remote desktop by communicating with the remote desktop in response to the release of the standby mode.

2. The method of claim 1, wherein the supporting of the booting of the PXE comprises:
   transmitting booting information for the remote desktop to load a boot file of the PXE, to the remote desktop, in response to a request from the remote desktop.

3. The method of claim 1, wherein the supporting of the booting of the determined operating system comprises:
   transmitting booting information for the remote desktop to the remote desktop in response to receiving a request from the remote desktop,
   wherein the booting information comprises a boot file of the determined operating system.

4. A method of operating a remote desktop connected with a main server through a network, the method comprising:
   receiving a power-on command from the main server;
   performing a power-on self-test in response to the power-on command;
   operating in a standby mode after completing the power-on self-test;
   releasing the standby mode in response to receiving a release command from the main server;
   performing booting of an operating system corresponding to a client, by communicating with the main server, after the release of the standby mode; and
   performing booting of a pre-boot execution environment (PXE), by communicating with the main server, after performing the power-on self-test,
   wherein the operating in the standby mode is performed after completing the performing booting of the PXE.

5. The method of claim 4,
   wherein the performing of the booting of the PXE comprises:
   loading a boot file of the PXE by receiving booting information from the main server, and
   wherein the booting of the PXE is performed based on the loaded boot file.

6. The method of claim 4,
   wherein the performing of the booting of the operating system comprises:
   loading a boot file of the operating system by receiving booting information from the main server, and
   wherein the booting of the operating system is performed based on the loaded boot file.

7. The method of claim 4, further comprising:
   providing a remote desktop service by communicating with the client through the network after completing the booting of the operating system.

8. A method of providing a remote desktop service with remote desktops to clients through a network, the method comprising:
   adjusting a number of the remote desktops having a standby mode, based on a predetermined policy, the adjusting comprising:
   commanding at least one remote desktop among remote desktops to power on, before receiving a service request for the remote desktop service from the clients; and
   supporting booting of a pre-boot execution environment (PXE) of the at least one remote desktop;
   operating the at least one remote desktop in the standby mode; and
   commanding one remote desktop of the at least one remote desktop in standby mode to release the standby mode in response to receiving a service request for the remote desktop service from any one of the clients.

9. The method of claim 8, further comprising:
   monitoring a number of clients using the remote desktop service,
   wherein the adjusting the number of the remote desktops having a standby mode comprises:
   adjusting the number of the remote desktops having the standby mode, depending on a result of the monitoring of the number of clients using the remote desktop service.

10. The method of claim 8, further comprising:
    supporting booting of an operating system in response to the service request received from the any one of the clients, by communicating with the one remote desktop which has released the standby mode.

* * * * *